(12) United States Patent
Markine

(10) Patent No.: US 9,049,137 B1
(45) Date of Patent: Jun. 2, 2015

(54) HASH BASED ECMP LOAD BALANCING WITH NON-POWER-OF-2 PORT GROUP SIZES

(75) Inventor: Mikhail Markine, Mountain View, CA (US)

(73) Assignee: Google Inc., Mountain View, CA (US)

( * ) Notice: Subject to any disclaimer, the term of this patent is extended or adjusted under 35 U.S.C. 154(b) by 358 days.

(21) Appl. No.: 13/567,396

(22) Filed: Aug. 6, 2012

(51) Int. Cl.
  *H04L 12/56* (2006.01)
  *H04L 12/761* (2013.01)
  *H04L 12/18* (2006.01)
  *H04L 12/721* (2013.01)

(52) U.S. Cl.
  CPC .......... *H04L 45/16* (2013.01); *H04L 45/12* (2013.01); *H04L 12/185* (2013.01)

(58) Field of Classification Search
  CPC .................................................. H04W 28/08
  USPC .................................. 370/235, 238, 386, 390
  See application file for complete search history.

(56) References Cited

U.S. PATENT DOCUMENTS

| | | | |
|---|---|---|---|
| 7,680,923 B1 * | 3/2010 | Allan | 709/224 |
| 8,756,424 B2 * | 6/2014 | Roitshtein et al. | 713/171 |
| 2003/0137978 A1 * | 7/2003 | Kanetake | 370/386 |
| 2004/0264464 A1 * | 12/2004 | Wong | 370/390 |
| 2010/0046515 A1 * | 2/2010 | Wong | 370/390 |
| 2012/0106347 A1 * | 5/2012 | Allan et al. | 370/238 |

* cited by examiner

*Primary Examiner* — Jung Park
*Assistant Examiner* — Chuong M Nguyen
(74) *Attorney, Agent, or Firm* — Edward A. Gordon; Foley & Lardner LLP

(57) ABSTRACT

The invention is directed to optimizing load balancing for equal cost multiple path (ECMP) network routing by improving the load balancing of network data traffic across multiple equal cost next hop egress network links that have the same next hop routing cost. At least one of the various embodiments may enable improve load balancing of egress network links by programming network routing tables and conducting diagnostic processes and testing to determine if a programmed network routing table optimally load balances the outgoing the network data traffic among the equal cost next hop egress network links. If an embodiment determines that a programmed network routing table is load balancing less effectively than desired, it may re-program the network routing table(s).

21 Claims, 13 Drawing Sheets

| R=2 | L0 | L1 | L2 | L3 | L4 |
|---|---|---|---|---|---|
| C1 | 1.33 | 1 | 1 | 1 | 1 |
| C2 | 1 | 1 | 1.33 | 1 | 1 |
| C3 | 1 | 1 | 1 | 1 | 1.33 |
| | 1.11 | 1 | 1.11 | 1 | 1.11 |

| R=0 | L0 | L1 | L2 | L3 | L4 |
|---|---|---|---|---|---|
| C1 | B0 | B1 | B2 | B3 | B4 |
| C2 | B0 | B1 | B2 | B3 | B4 |
| C3 | B0 | B1 | B2 | B3 | B4 |
|  |  |  |  |  |  |

*Fig. 5A*

| R=1 | L0 | L1 | L2 | L3 | L4 |
|---|---|---|---|---|---|
| C1 | B0 | B1 | B2 | B3 | B4 |
| C2 | B4 | B0 | B1 | B2 | B3 |
| C3 | B3 | B4 | B0 | B1 | B2 |
|  |  |  |  |  |  |

*Fig. 5B*

| R=2 | L0 | L1 | L2 | L3 | L4 |
|---|---|---|---|---|---|
| C1 | B0 | B1 | B2 | B3 | B4 |
| C2 | B3 | B4 | B0 | B1 | B2 |
| C3 | B1 | B2 | B3 | B4 | B0 |
|  |  |  |  |  |  |

*Fig. 5C*

| R=0 | L0 | L1 | L2 | L3 | L4 |
|---|---|---|---|---|---|
| C1 | 4 | 3 | 3 | 3 | 3 |
| C2 | 4 | 3 | 3 | 3 | 3 |
| C3 | 4 | 3 | 3 | 3 | 3 |
|  | 12 | 9 | 9 | 9 | 9 |

*Fig. 6A*

| R=1 | L0 | L1 | L2 | L3 | L4 |
|---|---|---|---|---|---|
| C1 | 4 | 3 | 3 | 3 | 3 |
| C2 | 3 | 4 | 3 | 3 | 3 |
| C3 | 3 | 3 | 4 | 3 | 3 |
|  | 10 | 10 | 10 | 9 | 9 |

*Fig. 6B*

| R=2 | L0 | L1 | L2 | L3 | L4 |
|---|---|---|---|---|---|
| C1 | 4 | 3 | 3 | 3 | 3 |
| C2 | 3 | 3 | 4 | 3 | 3 |
| C3 | 3 | 3 | 3 | 3 | 4 |
|  | 10 | 9 | 10 | 9 | 10 |

*Fig. 6C*

| Hash Key | H modulo N | Bin |
|---|---|---|
| 0 | 0 modulo 16 | 0 |
| 1 | 1 modulo 16 | 1 |
| 2 | 2 modulo 16 | 2 |
| 3 | 3 modulo 16 | 3 |
| 4 | 4 modulo 16 | 4 |
| 5 | 5 modulo 16 | 5 |
| 6 | 6 modulo 16 | 6 |
| 7 | 7 modulo 16 | 7 |
| 8 | 8 modulo 16 | 8 |
| 9 | 9 modulo 16 | 9 |
| 10 | 10 modulo 16 | 10 |
| 11 | 11 modulo 16 | 11 |
| 12 | 12 modulo 16 | 12 |
| 13 | 13 modulo 16 | 13 |
| 14 | 14 modulo 16 | 14 |
| 15 | 15 modulo 16 | 15 |

*Fig. 7A*

| Hash Key | H modulo N | Bin |
|---|---|---|
| 0 | 0 modulo 5 | 0 |
| 1 | 1 modulo 5 | 1 |
| 2 | 2 modulo 5 | 2 |
| 3 | 3 modulo 5 | 3 |
| 4 | 4 modulo 5 | 4 |
| 5 | 5 modulo 5 | 0 |
| 6 | 6 modulo 5 | 1 |
| 7 | 7 modulo 5 | 2 |
| 8 | 8 modulo 5 | 3 |
| 9 | 9 modulo 5 | 4 |
| 10 | 10 modulo 5 | 0 |
| 11 | 11 modulo 5 | 1 |
| 12 | 12 modulo 5 | 2 |
| 13 | 13 modulo 5 | 3 |
| 14 | 14 modulo 5 | 4 |
| 15 | 15 modulo 5 | 0 |

*Fig. 7B*

| R=0 | L0 | L1 | L2 | L3 | L4 |
|---|---|---|---|---|---|
| C1 | 1.33 | 1 | 1 | 1 | 1 |
| C2 | 1.33 | 1 | 1 | 1 | 1 |
| C3 | 1.33 | 1 | 1 | 1 | 1 |
|  | 1.33 | 1 | 1 | 1 | 1 |

*Fig. 8A*

| R=1 | L0 | L1 | L2 | L3 | L4 |
|---|---|---|---|---|---|
| C1 | 1.33 | 1 | 1 | 1 | 1 |
| C2 | 1 | 1.33 | 1 | 1 | 1 |
| C3 | 1 | 1 | 1.33 | 1 | 1 |
|  | 1.11 | 1.11 | 1.11 | 1 | 1 |

*Fig. 8B*

| R=2 | L0 | L1 | L2 | L3 | L4 |
|---|---|---|---|---|---|
| C1 | 1.33 | 1 | 1 | 1 | 1 |
| C2 | 1 | 1 | 1.33 | 1 | 1 |
| C3 | 1 | 1 | 1 | 1 | 1.33 |
|  | 1.11 | 1 | 1.11 | 1 | 1.11 |

*Fig. 8C*

HASH BASED ECMP LOAD BALANCING WITH NON-POWER-OF-2 PORT GROUP SIZES

TECHNICAL FIELD

Various embodiments relate generally to load balancing network traffic, and more particularly to, load balance network traffic across equal-cost multi-path (ECMP) network links.

BACKGROUND

Equal-cost multi-path (ECMP) routing is a network routing technique where incoming network traffic destined for the same next-hop destination may be routed over multiple "best cost" paths. Generally, network routers are designed to forward incoming network traffic using egress network links that offer the lowest cost for the next hops. Network routers determine lowest cost egress network links by considering multiple metrics such as, network path length, reliability, delay, bandwidth, load, and the like. When multiple egress network links are determined to have equal cost, network routers may sometimes apply load balancing algorithms to distribute network traffic among the equal cost next hop egress network links. In many circumstances, the effectiveness of load balancing depends several factors, such as, network topology, network protocol, number of egress network links, probability of egress network link failure, hardware configuration and features, number of ingress network links, network routing table geometry, and the like. For example, some commonly used ECMP load balancing strategies are less effective when the number of equal cost next hop egress network links is not a power-of-two.

Given the dynamic nature of network traffic and the complexity of network architecture and routing configurations it can be difficult for network administrators to identify and implement ECMP load balancing strategies that are effective. However, ECMP load balancing may be improved if network routing tables can be programmed when load balancing performance is determined to be unsatisfactory.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, wherein:

FIGS. 5A, 5B, and 5C illustrate examples in which various embodiments may program network routing tables;

FIGS. 6A, 6B, and 6C illustrate examples of load balancing based on programmed network routing tables;

FIGS. 7A and 7B illustrate two examples using a hash based load balancing function;

FIGS. 8A, 8B, and 8C illustrate examples of aggregate load balancing based on programmed network routing tables;

DESCRIPTION OF THE EMBODIMENTS

Figure 1:
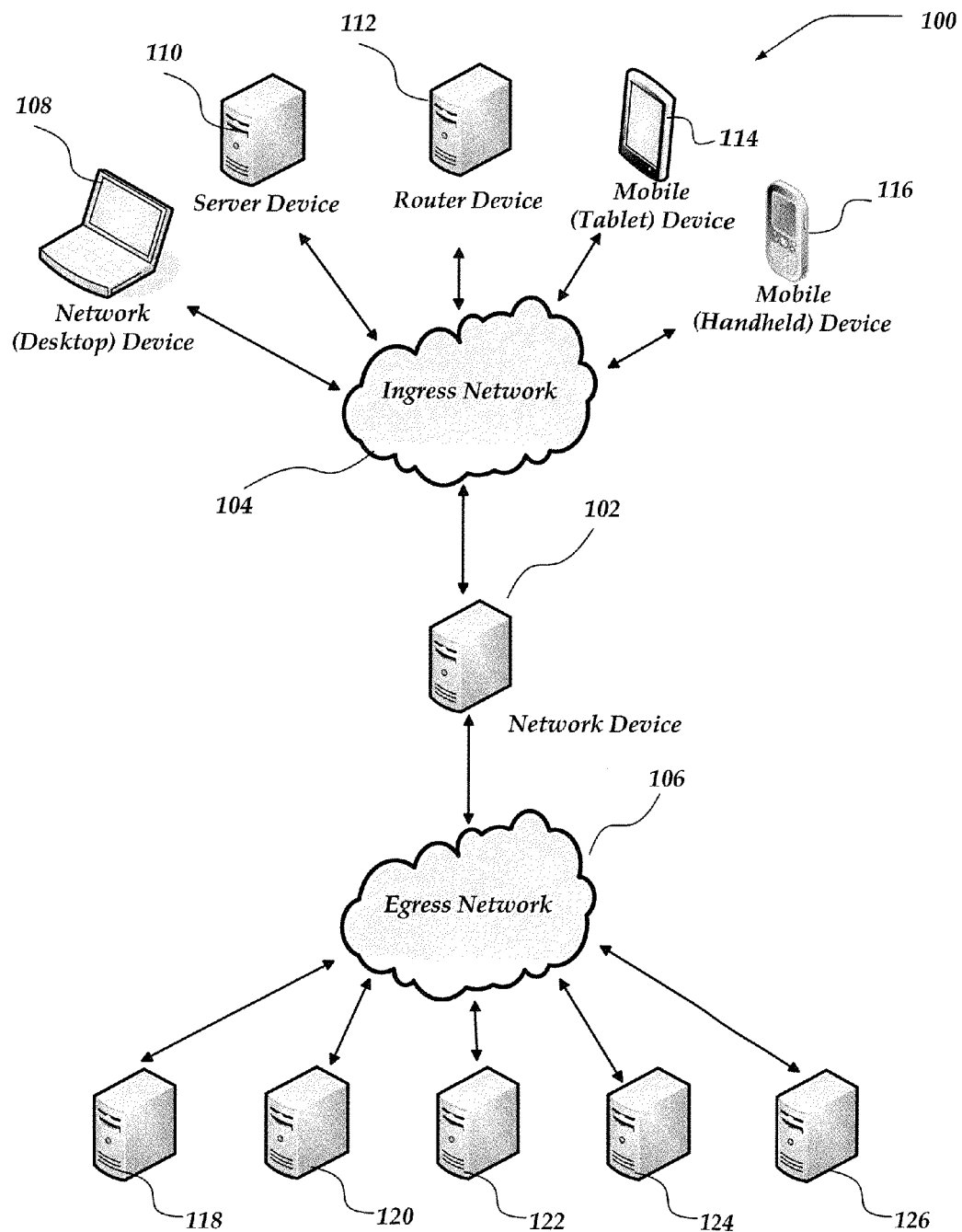
FIG. 1 illustrates an overview of a system in which various embodiments may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, various embodiments are directed towards improving and optimizing load balancing for equal cost multiple path (ECMP) network routing by improving the load balancing of network data traffic across multiple equal cost next hop egress network links that have the same next hop routing cost. At least one of the various embodiments may enable improved load balancing of egress network links by programming network routing tables, for example ECMP routing tables, and conducting diagnostic processes and testing to determine if a programmed network routing table optimally load balances outgoing network data traffic among the equal cost next hop egress network links. If an embodiment determines that a programmed network routing table is load balancing less effectively than desired, it may re-program the network routing table(s).

At least one of the various embodiments may enable minimizing network data traffic flow disruption that may occur when an ECMP load balancer forwards network data that is part of the same session, or stream, to different equal cost egress network links. In at least one of the various embodiments, network data traffic flow disruption may be reduced by employing a bucketing function that may enable network data having the same source and destination to be forwarded to the same egress network link. Minimizing network data traffic flow disruption may improve network data traffic performance because some network protocols, such as TCP, are well known to benefit from sending all network data for a session through the same egress network link. In cases where flow disruption is not at issue at least one of the various embodiments may route network flows disregarding whether the all network data in a network stream is being forwarded to the same egress network link.

At least one of the various embodiments may use one or more switching chips each having separate network routing tables that may be programmed to route incoming network data arriving at ingress network links to equal cost next hop egress network links. In at least one of the various embodiments, the switching chips may be grouped together so that all switching chips in the group may route network data to the same set of equal cost next hop egress network links. At least one of the various embodiments may program the network routing tables of the grouped switching chips to load balance incoming network data as evenly as possible across the determined equal cost next hop egress network links. Also, at least one of the various embodiments may determine how the network routing tables should be re-programmed to optimize load balancing for the equal cost next hop egress network links. In at least one of the various embodiments, optimizing the load balancing across the equal cost next hop egress network links includes distributing the network data traffic across the equal cost next hop egress network links as evenly as possible. In at least one of the various embodiments, optimization may have different goals depending on the desired performance goals. At least one of the various embodiments may measure the load balancing performance of one or more programmed network routing tables to determine if the forwarded network data traffic is being evenly distributed to the egress network links. Further, at least one of the various embodiments may be arranged to monitor network data traffic and distribution to detect when network data is being distributed over the equal cost next hop egress network links unevenly. For example, if undesirable load balancing of network data is detected, one or more actions may be performed including: logging the occurrence to a log file; sending a notification email to an operator, sending a text message to an operator, signaling the event by using a user-interface; triggering an optimization cycle, and the like. Also, at least one of the various embodiments may be arranged to initiate re-programming of the network routing tables to correct uneven load balancing of network data.

At least one of the various embodiments may be arranged to determine load balancing strategy by determining which load balancing function to apply when distributing incoming network data traffic. The particular load balancing function may be determined after monitoring the quality of the distribution of the network data traffic. If the network data traffic is not being distributed satisfactorily, embodiments may be enabled to determine another load balancing strategy. The particular strategy may be determined based on variety of methods, such as, random selection, round-robin, rule-based determination, manual configuration by an operator, and the like. Rules employed to determine load balancing strategy may be applied to accommodate the virtual and hardware resources available. Also, for at least one of the various embodiments, having an egress network link count that is not a power of two may require load balancing strategies that are different than embodiments having egress network link counts that the are a power of two. In some cases, at least one of the various embodiments may be arranged to only have one load balancing strategy available.

At least one of the various embodiments may employ a load balancing strategy based on grouping ingress network links into sets, where each set of ingress network links may have a corresponding network routing table. And, each set of ingress network links may have its corresponding network routing table programmed independently to route incoming network data traffic to the same set of egress network links. In at least one of the various embodiments, the grouping of ingress network links may be based on available switching hardware or software. Also, for at least one of the various embodiments, each ingress network link set may correspond to a unique network switching chip where each switching chip has its own programmable network routing table. In any event, in at least one of the various embodiments, ingress networking links grouped into sets having separate and distinct network routing tables may be enabled to program the network routing table individually to determine the load balancing of network flows routed to the egress network links.

At least one of the various embodiments may load balance network data traffic based on a hash key (H) generated from some or all of the incoming network data. The hash key may have a fixed bit length (K). An index (B) may be calculated as H modulo the number of egress network links (N). (B=H modulo N). Functions of this type are sometimes called bucketing functions and the calculated indexes (B) are sometimes referred to as bins. The bin may be an index or pointer to an entry in the network routing table that may determine which equal cost next hop egress network link incoming network data from which the hash key was generated may be routed to. Assuming that the parts of the incoming network data used to generate the hash key are sufficiently random, selecting equal cost next hop egress network links using the B=H modulo N function may load balance the network data traffic across the equal cost next hop egress network links.

In at least one of the various embodiments, the distribution and quality of the load balancing may depend on how the network routing tables are programmed. Also, for at least one of the various embodiments, if the load balancing strategy uses a hashing function that generates hash keys having a bit-length of 4 bits then, for at least one of the various embodiments, there are a total of 16 possible hash keys. For at least one of the various embodiments, all of the network data received at the ingress network links will be assigned a hash value in the range of 0 through 15. If one of the various embodiments had 16 equal cost next hop egress network links it may have a network routing table with sixteen entries mapping each of the available hash values (16) to one egress network link. Assuming that the network data used to generate the hash key was sufficiently random, an embodiment so arranged would be expected to balance the network data traffic evenly across all of the 16 equal cost next hop egress network links. This load balancing strategy is illustrated in the table shown in FIG. 7A. However, in at least one of the various embodiments, having a non-power of 2 number of equal cost next hop egress network links may result in uneven load balancing because a bucketing function may not evenly load balance if there may be a non-power of 2 number of equal cost next hop egress network links.

Exemplary Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes one or more ingress network link node devices 108-116, network 104, egress network link network 106, one or more switches 102, and one or more egress network link node devices 116-126. Network 104 is in communication with and enables communication between each of the ingress network link node devices 108-116 and the switch(es) 102. Egress network link network 106 further enables communication with and enables communication between the switch(es) 102 and the egress network link node device 118-126.

Ingress network link node devices 108-116 may include virtually any computing device capable of receiving and sending network data over a network, and/or to and from another computing device. The set of such devices may include devices that typically connect using a wired communications medium such as personal computers, tablet computers, multiprocessor systems, servers, microprocessor-based or programmable consumer electronics, network PCs, switches, routers, hubs, and the like. Further, ingress network link node devices 108-116 may include any device that is capable of connecting via a wireless communication signal such as a personal digital assistant (PDA), pocket PC, wearable computer, portable computing device, tablet computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Ingress network link node devices may also include integrated devices combining one or more of the preceding devices and/or elements of one or more of these devices. Further, ingress network link devices may be switches, routers, hubs, and the like, that may be associated with other networks and/or sub-networks.

Ingress Network 104 and Egress Network 106 are configured to couple one computing device to another computing device, enabling them to communicate. Ingress Network 104 and Egress Network 106 are enabled to employ any form of medium for communicating information from one electronic device to another. Also, Ingress Network 104 and Egress Network 106 may include a wireless interface, and/or a wired interface, such as the Internet, Cloud Computing, and the like, in addition to local area networks (LANs), wide area networks (WANs), direct connections, such as through a universal serial bus (USB) port, other forms of communication medium, or any combination thereof. On an interconnected set of LANs, including those based on differing architectures and protocols, a router, switch and/or other network appliance may act as a link between LANs, enabling messages and data to be sent from one to another. Also, communication links within LANs may include twisted wire pair cable, coaxial cable, and fiber optic cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, Infra-Red links, Micro-wave links, Open Air Laser links, or other communications links known to those skilled in the art. Furthermore, remote computers and other related electronic devices could be remotely connected to either LANs or WANs via a modem and temporary telephone link.

Ingress Network 104 and Egress Network 106 are constructed for use with various communication protocols and technologies, including transmission control protocol/internet protocol (TCP/IP), user datagram protocol (UDP), a wireless application protocol (WAP), global system for mobile communications (GSM), code division multiple access (CDMA), wide code division multiple access (WCDMA), CDMA 2000, Long Term Evolution (LTE), high speed download packet access (HSDPA), time division multiple access (TDMA), general packet radio service (GPRS), ultra wide band (UWB), IEEE 802.16 Worldwide Interoperability for Microwave Access (WiMax), IEEE 802.11 (WiFi), and the like. In essence, Ingress Network 104 and Egress Network 106 include any communication method or medium by which information may travel between the various devices of system 100. Ingress Network 104 and Egress Network 106 may further include one or more network management devices, which may include network providers, load balancers, application managers, or the like. Network management devices may manage communication sessions, tag communication traffic, place data cookies on client devices, and perform other network management operations.

Ingress Network 104 and Egress Network 106 may include wireless interfaces, wireless forms of communication, and/or wireless links such as cellular networks, satellite links, Infra-Red, Micro-Wave links, Open Air Laser links, and the like. These wireless links may include various mobile communication protocols such as wireless application protocol (WAP), global system for mobile communications (GSM), code division multiple access (CDMA), time division multiple access (TDMA), wide code division multiple access (WCDMA), CDMA 2000, Long Term Evolution (LTE), high speed download packet access (HSDPA), general packet radio service (GPRS), ultra wide band (UWB), IEEE 802.16 Worldwide Interoperability for Microwave Access (WiMax), IEEE 802.11 (WiFi), and the like.

The medium used to transmit information in mobile communication links as described above may generally include any communication medium or communication media that can be accessed by a computing device. Such media may include any processor readable non-transitory storage media. Processor readable media may also include transitory wired and/or wireless communication media, or any combination thereof. Additionally, processor-readable media typically embodies computer-readable instructions, data structures, program modules, or other data. Such data may be stored on the processor readable non-transitory storage media. Such data may also be communicated through a communication medium in a modulated data signal such as a carrier wave, data signal, or other transport mechanism and can include any type of data. The signal can have one or more of its characteristics set or changed in such a manner as to encode information, instructions, data, and the like. By way of example, communication media includes wireless media such as fluids or space for acoustic, RF, infrared, laser, microwave, and other wireless signals, and wired media such as twisted pair, coaxial cable, fiber optics, wave guides, and other wired media.

Switch 102 is described in more detail below in conjunction with FIG. 2. Briefly, however, switch 102 includes on or more of virtually any network device configured to enable the receiving of network data from one or more ingress network link nodes 108-116 and forwarding the network data to one or more egress network link nodes 118-126. As such, switch 102 may be implemented on a variety of computing devices including personal computers, desktop computers, multiprocessor systems, microprocessor-based devices, network PCs, servers, proxy servers, reverse proxy servers, gateways, switches, routers, network appliances, and the like.

Egress network link nodes 118-126 represent virtually any network device, and the like, to which egress network link node may seek to forward network data. Such network devices may provide services that include, but are not limited to, web services, mail services, database services repositories, legacy services, telnet services, FTP services, and the like. Also, egress network link nodes 118-126 may be switches that further forward network data to other networks, such as, WANs, LANs, sub-networks, and the like. As such, egress network link nodes 118-126 may be implemented on a variety of computing devices including personal computers, desktop computers, multiprocessor systems, microprocessor-based devices, network PCs, servers, proxy servers, reverse proxy servers, gateways, switches, routers, network appliances, and the like.

Figure 2:
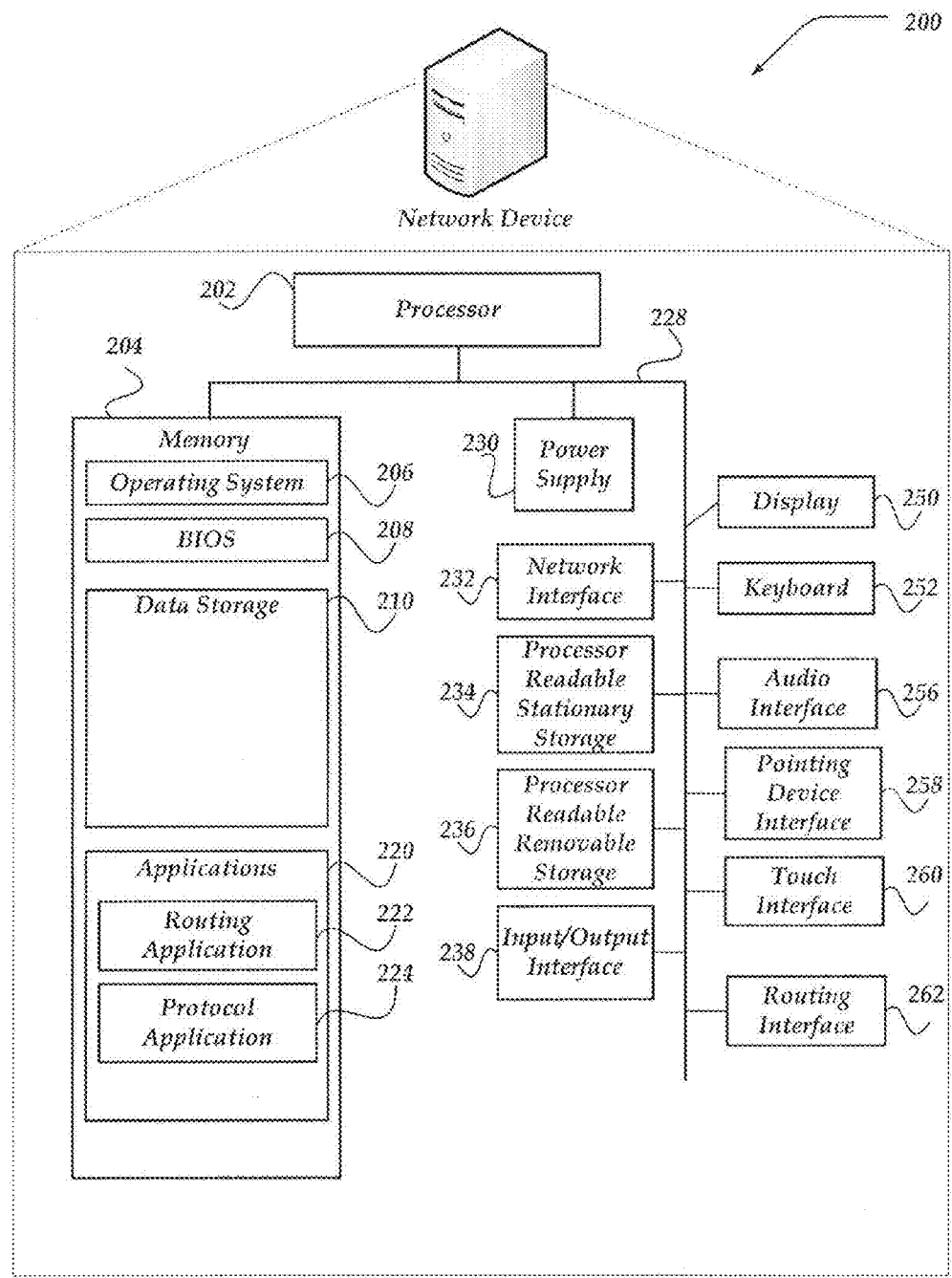
FIG. 2 shows an exemplary network device that may be arranged as a ECMP load balancing switch or router device.

FIG. 2 shows one embodiment of network device 200 that may be included in a system implementing the invention. Network device 200 may include many more or less components than those shown in FIG. 2. However, the components shown are sufficient to disclose an illustrative embodiment for practicing the present invention. Network device 200 may represent, for example, one embodiment of at least one of network device 102 of FIG. 1.

As shown in the figure, network device 200 includes a processor 202 in communication with a memory 204 via a bus 228. Network device 200 also includes a power supply 230, network interface 232, audio interface 256, display 250, keyboard 252, input/output interface 238, processor-readable stationary storage device 234, and processor-readable removable storage device 236. Power supply 230 provides power to network device 200.

Network interface 232 includes circuitry for coupling network device 200 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), wide code division multiple access (WCDMA), CDMA 2000, Long Term Evolution (LTE), high speed download packet access (HSDPA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), IEEE 802.11 (WiFi), Session Initiation Protocol/Real-time Transport Protocol (SIP/RTP), or any of a variety of other wired and wireless communication protocols. Network interface 232 is sometimes known as a transceiver, transceiving device, or network interface card (NIC). Network device 200 may optionally communicate with a base station (not shown), or directly with another computing device.

Audio interface 256 is arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of network device 200, for example, using voice recognition.

Display 250 may be a liquid crystal display (LCD), gas plasma, electronic ink, light emitting diode (LED), Organic LED (OLED) or any other type of light reflective or light transmissive display that can be used with a computing device. Display 250 may be a handheld projector or pico projector capable of projecting an image on a wall or other object.

Network device 200 also may also comprise input/output interface 238 for communicating with external devices not shown in FIG. 2. Input/output interface 238 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 200, allowing for remote input and/or output to network device 200. For example, information routed as described here through human interface components such as display 250 or keyboard 252 can instead be routed through the network interface 232 to appropriate human interface components located elsewhere on the network. Human interface components include any component that allows the computer to take input from, or send output to, a human user of a computer.

Memory 204 may include Random Access Memory (RAM), Read-Only Memory (ROM), and/or other types of memory. Memory 204 illustrates an example of computer-readable storage media (devices) for storage of information such as computer-readable instructions, data structures, program modules or other data. Memory 204 stores a basic input/output system (BIOS) 208 for controlling low-level operation of network device 200. The memory also stores an operating system 206 for controlling the operation of network device 200. It will be appreciated that this component may include a general-purpose operating system such as a version of UNIX, or LINUX™, or a specialized operating system such as Microsoft Corporation's Windows® operating system, or the Apple Corporation's MAC OS® operating system. The operating system may include, or interface with a Java virtual machine module that enables control of hardware components and/or operating system operations via Java application programs.

Memory 204 further includes one or more data storage 210, which can be utilized by network device 200 to store, among other things, applications 220 and/or other data. For example, data storage 210 may also be employed to store information that describes various capabilities of network device 200. The information may then be provided to another device based on any of a variety of events, including being sent as part of a header during a communication, sent upon request, or the like. Data storage 210 may also be employed to store social networking information including address books, buddy lists, aliases, user profile information, or the like. Data stores 210 may further include program code, data, algorithms, and the like, for use by a processor, such as processor 202 to execute and perform actions. In one embodiment, at least some of data store 210 might also be stored on another component of network device 200, including, but not limited to, non-transitory media inside processor-readable removable storage device 236, processor-readable stationary storage device 234, or any other computer-readable storage device within network device 200, or even external to network device 200.

Applications 220 may include computer executable instructions which, when executed by network device 200, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 220 may include, for example, Routing Application 222 and Protocol Application 224.

Figure 3:
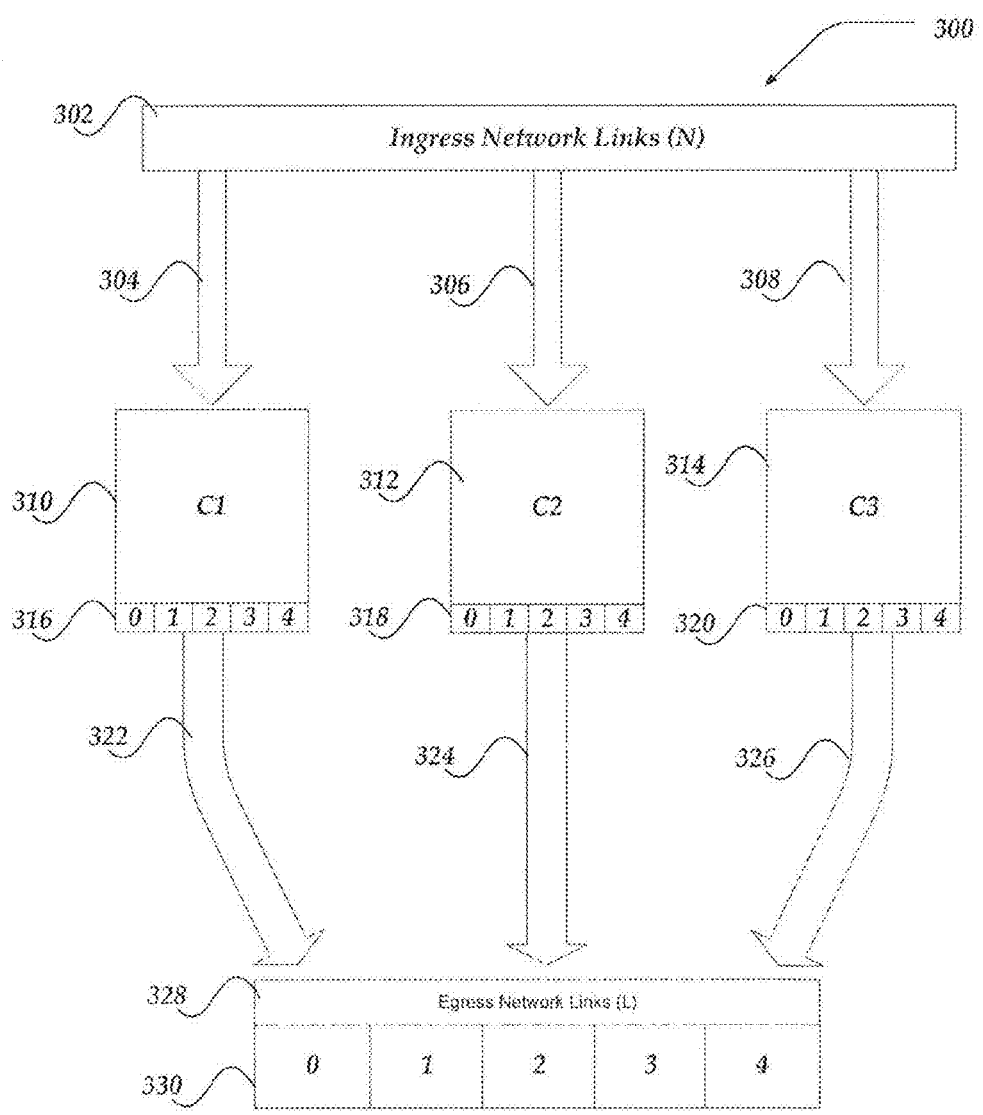
FIG. 3 illustrates an example of a system in which various embodiments of an ECMP load balancer may be implemented with coupled ingress network links, switching chips, routing tables, and egress network links.

FIG. 3 shows one of the various embodiments 300 that may load balance network data traffic by using three groups of ingress network links 304-308. Each group of ingress network links may be processed by corresponding switching chips 310-314. Even though FIG. 3 shows three switching chips it should be appreciated that various embodiments may be arranged with different numbers of switching chips. Also, one of ordinary skill in the art should appreciate that various embodiments may implement switching chips 310-314 by applying a variety of techniques, such as, using several individual hardware switching chips, integrated devices, microcontrollers, virtual switches implemented in software, a combination of circuitry and custom chips, FPGA's, and the like. Further, at least one of the various embodiments 300 may be incorporated in switches, routers, and integrated circuit chips supplied by third-party vendors, including, but not limited to, Broadcom Corporation's StrataXGS family, Cisco Systems Catalyst 6500 family, and the like. One of ordinary skill in the art will appreciate that the arrangement of ingress network links may be influenced by many reasons, including, compatibility with the physical configuration of upstream hardware, cabling considerations, bandwidth shaping, network fabric organization, the switching chips, hardware geometry, expense and cost, and the like. Further, at the least one of the various embodiments may enable the sets of ingress network links that may be virtual groupings of links. Also, in at least one of the various embodiments, ingress network links may be grouped into sets based on their physical layout.

Continuing, with FIG. 3, a number of ingress network links (N) 302 may receive incoming network data from Ingress Network 104. Based on how an embodiment is arranged and/or configured the incoming network data arriving at the ingress network links may be routed through physical, logical, or virtual paths 304-308 to one or more switching chips 310-314. The switching chips may apply a load balancing function that may associate the incoming network data with a bin in programmed network routing table 316-320. Incoming network data may be routed through the programmed network route tables 316-320 to signal paths 322-326. In at least one of the various embodiments, signal path 322-326 may be physical, logical, or virtual signal paths that may carry the network data to various elements of the embodiment 300. In at least one of the various embodiments, the signal paths 322-326 may carry network data from the switching chips 310-314 and/or programmed network route tables 316-320 to a shared bus 328. Continuing from the shared bus, the incoming network data may arrive at its destined the egress network link 330 and forwarded on to the next hop (destination).

In at least one of the various embodiments, the switching chips 310-314 may be arranged to determine the equal cost next hop egress network links which to forward the incoming network data. In embodiments the switching chip may be arranged to load balance network data to multiple equal cost next hop egress network links. In at least one of the various embodiments, the switching chips may use allocation functions that may determine which of the equal cost next hop egress network links to use. A number of considerations may be taken into account when determining the load balancing function to use. For one it may be desirable to route network data from the same network data traffic session/flow through the same egress network link to help avoid network data traffic flow disruption which can cause increased overhead and latency in some stream based protocols (e.g., TCP/IP). In at least one of the various embodiments, network data may be load balanced using bucketing functions to allocated incoming network data among a set of bins, where each bin, may be translated to an egress network link. Various embodiments may use a bucketing function that is at least partially based on the content of the network data being forwarded to help identify network data that is part of the same network data traffic flow or session.

In at least one of the various embodiments, each switching chip may have a separate bucketing function for determining the bin where to allocate the network data. In another of the various embodiments, all the switching chips in an embodiment may employ the same function for load balancing network data among equal cost next hop egress network links.

Once again referring back to FIG. 3, the embodiment 300 may have switching chips 310-314 that each have five bins 316-320. And each bin may be mapped to one of five of the available egress network links 330. In at least one of the various embodiments, a collector bus 328 may be employed to gather signal paths 322-326 coming from multiple switching chips and multiplex them appropriately. One of ordinary skill in the art will recognize that there are many well-known ways to enable multiple signal paths to route signals to the same destination link, e.g., multiplexing signal paths.

At least one of the various embodiments may be arranged to cooperatively program network routing tables by varying how network routing tables in the group map from load balancing bins to egress network links. At least one of the various embodiments may determine a value (R) and apply it to shift-rotate how the load balancing bins map to the egress network links. For at least one of the various embodiments, if R is determined to be zero, the network routing tables in the group may be programmed so the first load balancing bin may map to the first egress network link. If, R is determined to be one, then the first network table in the group remains unmodified, the second network routing table is right shift rotated by the value of R, (one in this non-limiting example). This may result in mapping the second load balancing bin in the second switching chips network routing table to the first egress network link. And, correspondingly, the third load balancing bin in the second switching chip network routing table would be mapped to the second egress network link. This shift rotation continues until the first load balancing bin is mapped to the last egress network link. Subsequent, network routing tables in the group may be shifted by an increment of R based on the previous network routing table in the set.

In at least one of the various embodiments, once the network routing tables are programmed, load balancing performance may be monitored. If the load balancing of the network data traffic is not satisfactory, then at least one of the various embodiments may enable reprogramming of the network routing tables again using a different R increment or one of the various embodiments may choose a different load balancing strategy to meet a determined level of performance.

Exemplary Flowcharts

Figure 4:
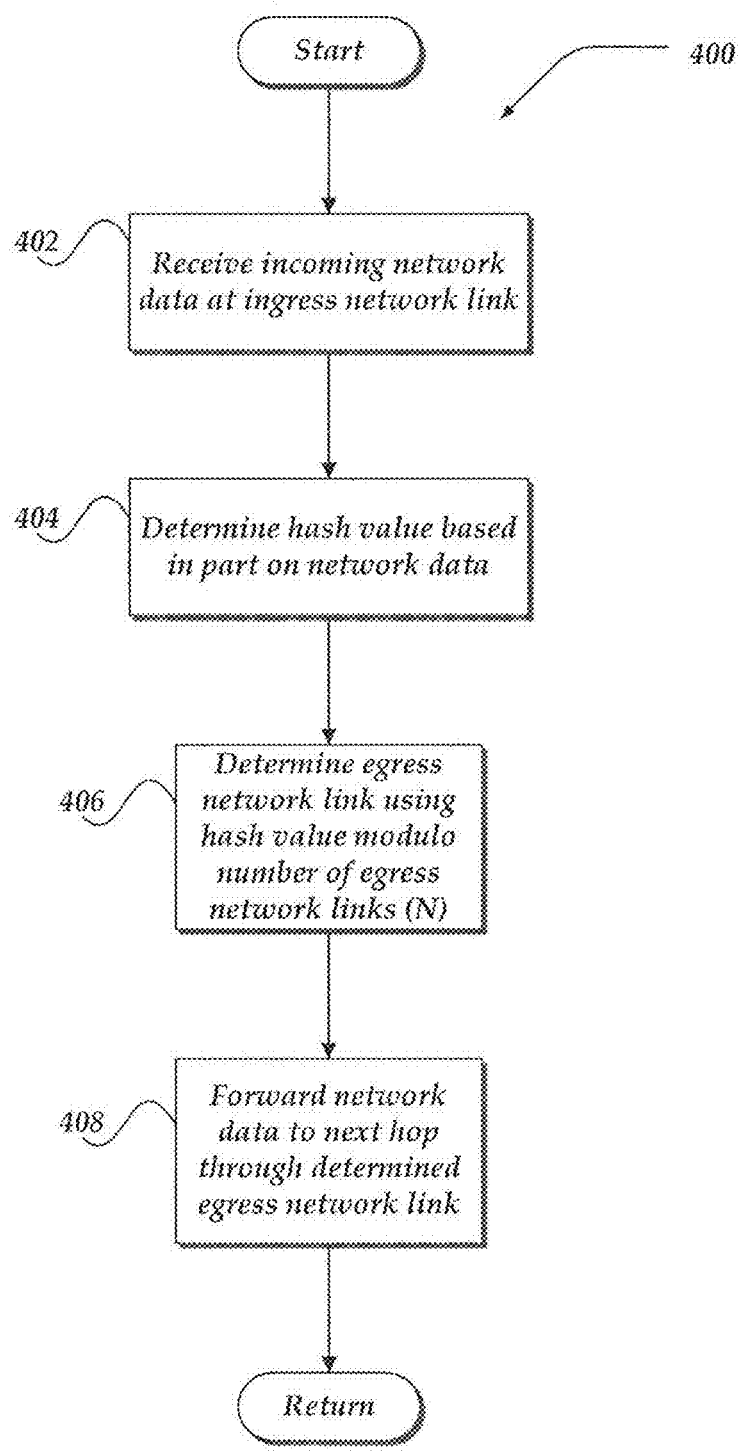
FIG. 4 shows a flow chart of a process for load balancing network traffic across ECMP egress network links.

FIG. 4 illustrates exemplary process 400 for forwarding network data to equal cost next-hop egress network links. At block 402, the process receives incoming network data at an ingress network link. The network data may come from another network that is part of same system as the process or it may come from an outside network. In any event, to reach its ultimate destination the network data is forwarded to an egress network link that may transmit the network data to the next hop which may be the ultimate destination for the network data. In at least one of the various embodiments, the network data may be OSI Layer 1-4 protocols, such as ATM, AppleTalk, IPv4, 1Pv6, TCP/IP, UDP, IPX/SPX, and the like. Other embodiments may support higher OSI Layer protocols, such as, SMB, HTTP, SNMP, RDP, FTP, RTP, SSH, and the like.

Next, at block 404, the process determines a hash value based in part on the incoming network data. In at least one of the various embodiments, meta data extracted from, or associated with, the incoming network data may be collected. In at least one of the various embodiments, a hash digest value may calculated by employing a well known hashing technique such as CRC16, and the like. In at least one of the various embodiments, the hash value determination may be a feature enabled using built-in functionality of the switching chips. Also, in at least one of the various embodiments, well-known fields present in the network data such as the source identifier and the destination identifier may be combined with some additional information to create the hash value. This additional information used when creating the hash value may be of a type that enables determining the various qualities of the network data being processed, such as, whether the network data is part of a video stream, stream priority or quality of service (QoS), and the like. In at least one of the various embodiments, the hash value may be constrained to fixed size that establishes a set number of bins in the hash. For example, hash values constrained to 4-bits would result in hash key values ranging from 0 through 15 (0b0000-0b1111).

In block 406, the process uses a bucketing function to determine the bin that should be associated with the incoming network data. The bin may be applied to a programmed network routing table to determine an egress network link. In at least one of the various embodiments, the bin may be determined by the function B=H modulo N, where B is the bin index/number, H is the hash value, and N is number of equal cost egress network links. The operation of this function is described in more detail in regard to FIG. 7A. Next, at block 408, the process forwards the network data to the next-hop through the determined egress network link and then returns control to the calling process when finished.

FIG. 5A shows for at least one of the various embodiments, the relationship between switching chips, bins, and egress network links. The left column shows C1, C2, C3 representing three switching chips that may be part of one of the various embodiments. The top row of the table shows the equal cost next hop egress network links, L0-L4 for this non-limiting exemplary embodiment. The values, B0-B4 represent the switching chip bins. As shown, this embodiment may have three switching chips C1, C2, C3, five egress network links L0-L4, and five bins B0-B4. Each row shows how a switching chip's network routing table is programmed to map bins to egress network links. In FIG. 5A, the bins for each switching chip are mapped "straight across" to a egress network link, e.g., for each switching chip bin B0 is mapped to egress network link L0, bin B1 is mapped to egress network link L1, and so on. The configuration depicted in FIG. 5A results in incoming network data processed by switching chip C1 that is determined to map into the second bin (B1) to be forwarded to the next-hop by way of egress network link L1. FIGS. 5B, and 5C depict various embodiments arranged and programmed to map the bins to egress network links using configurations that are different than shown in FIG. 5A.

In at least one of the various embodiments, bucketing functions similar to those depicted in FIGS. 7A and 7B may be used. As discussed above, bucketing functions may be used to load balance incoming network data among a plurality of bins, where each bin is mapped to an egress network link. The bucketing function used by at least the embodiments shown in FIGS. 7A and 7B is: H modulo N=Bin, where H is the determined hash key for the network data; N is the number of equal cost next hop egress network links that may be available; and Bin is the bin where network data is allocated to for load balancing, N may also be the number of bins available.

Also, the various embodiments depicted in FIGS. 7A, and 7B may have a Hash Key that is fixed or compressed to a length of four bits, thus the generated hash key may have a value between 0 and 15 (0b0000-0b1111). FIG. 7A shows one of the various embodiments that has been programmed to have 16 equal costs next hop egress network links. As shown in FIG. 7A, incoming network data that results in a hash key of 0 may be allocated to Bin 0 (B0). Further, incoming network data that may result in a hash key of 7 can be allocated to Bin 7 (B7). Further, it should be understood that the hash key values may be produced in randomized order based on the randomness of the incoming network data in the figure they are shown for clarity and readability. Accordingly, as shown in FIG. 7A, in at least one of the various embodiments, each bin may be mapped to one equal cost next hop egress network link. Thus, if there are 16 egress network links and a range of 16 hash keys, the incoming network data is most likely be evenly distributed across all of the egress network links. The even distribution is illustrated in FIG. 7A by showing that each Bin (0-15) is subscribed to the same number of times for the full range of the hash keys.

Turning to FIG. 7B the same bucketing function as shown in FIG. 7A may be used, however, in the case shown in FIG. 7B, the embodiment may have five equal cost next hop network links rather than 16. For this embodiment the hash key values 0, 1, 2, 3, and 4 map to Bins 0, 1, 2, 3, and 4, respectively, this may be the same as the embodiment shown in FIG. 7A. However, for incoming network data that may result in a hash key of 5 (0b0101) the bucketing function allocates the incoming network data to Bin 0. This may be a result of the hash key range (0-15) exceeding the number of the available bins. As the bucketing function is applied, the incoming network data may be unevenly load balanced across the bins. This may result in one or more of the bins being oversubscribed. An oversubscribed bin may result in the corresponding equal cost next hop network link being oversubscribed. In at least one of the various embodiments, as shown in FIG. 7B, incoming network data may be allocated to Bin 0 (B0) four times while the other Bins (B1-B4) may be allocated three times.

Returning to FIG. 5A, in at least one of the various embodiments, three switching chips may be used, with each switching chip routing to the same five equal cost next hop egress network links (L0-L4). As discussed above, a bucketing function may result in the same number of Bins (B0-B4) as the number of equal cost next hop network links. In FIG. 5A, all three switching chips may be programmed so incoming network data allocated to Bin B0 may be routed to egress network link L0. Likewise, all three switching chips may be programmed so incoming network data allocated to Bin B1 is routed to egress network link L1. Further, B2 is routed to L2, B3 is routed to L3, and B4 is routed to L4.

In an embodiment programmed as depicted in FIG. 5A, FIG. 6A shows the number of times incoming network data are routed to each egress network link (L0-L4). As shown in FIG. 6A, in at least one of the various embodiments, that may have three switching chips with network routing tables programmed as shown in FIG. 5A, incoming network data can be routed 12 times to equal cost next hop egress network link L0 when other egress network links L1-L4 have been routed 9 times. FIG. 8A, further illustrates the oversubscription of egress network link L0 in the aggregate when an embodiment is programmed as depicted in FIG. 5A. In at least one of the various embodiments, shown in FIG. 8A, egress network link L0 can be oversubscribed by 33% compared to the other egress network links (L1-L4). Likewise, if an operator wants to avoid traffic loss that may occur because of oversubscription, the incoming network data flow may be reduced so the oversubscribed egress network link (L0) is utilized up to 100% capacity with the remaining egress network links (L1-L4) scaled to 75% utilization. In this case, overall egress network link utilization may be reduced to 80% (e.g., 80%=(100%+4*75%)/5).

In at least one of the various embodiments, the mapping of the equal cost next hop egress network links to switching chip bins may be modified by right shift rotating the network routing table of a switching chip relative to other switching chips in the same group. FIG. 5B shows an embodiment where switching chip C2 is programmed to map bins to egress network links by applying a right shift value of (R=11). In this embodiment switching chip C3 maps bins to egress network links right shift rotating one relative to switching chip C2. Similarly, in an embodiment depicted in FIG. 5C the switching chips have the mapping of bins (B0-B4) to egress network links (L0-L4) right shift rotated twice (R=2) relative to the prior switching chip. As noted before, the various embodiments are not limited to having three switching chips. Nor, are they limited to having five egress network links and five bins. Also, the shifting values should not be considered to be limited to 0, 1, or 2. Further, it should be appreciated one of ordinary skill in the art that programming switching chips to route equal cost next hop egress network links is not limited to mapping bins to egress network links. The FIG. 5A-5B depicts at least one embodiment and has been presented in detail for the purposes of clarity.

FIG. 6B shows how incoming network data may be routed for at least one of the various embodiments where the switching chips are programmed as depicted in FIG. 5B. As shown in FIG. 6B, in this embodiment, incoming network data is routed to equal cost next hop egress network links L0-L2 ten times each and to equal cost next hop egress network links L3-L4 nine times each. L0-L2 may be oversubscribed but as shown in FIG. 8B, an embodiment programmed in this manner may in aggregate load balance incoming network links more evenly that an embodiment programmed as depicted in FIG. 5A. Another embodiment programmed as shown in FIG. 5C also indicates a similar improvement in load balancing over the programming used in FIG. 5A.

Figure 9:
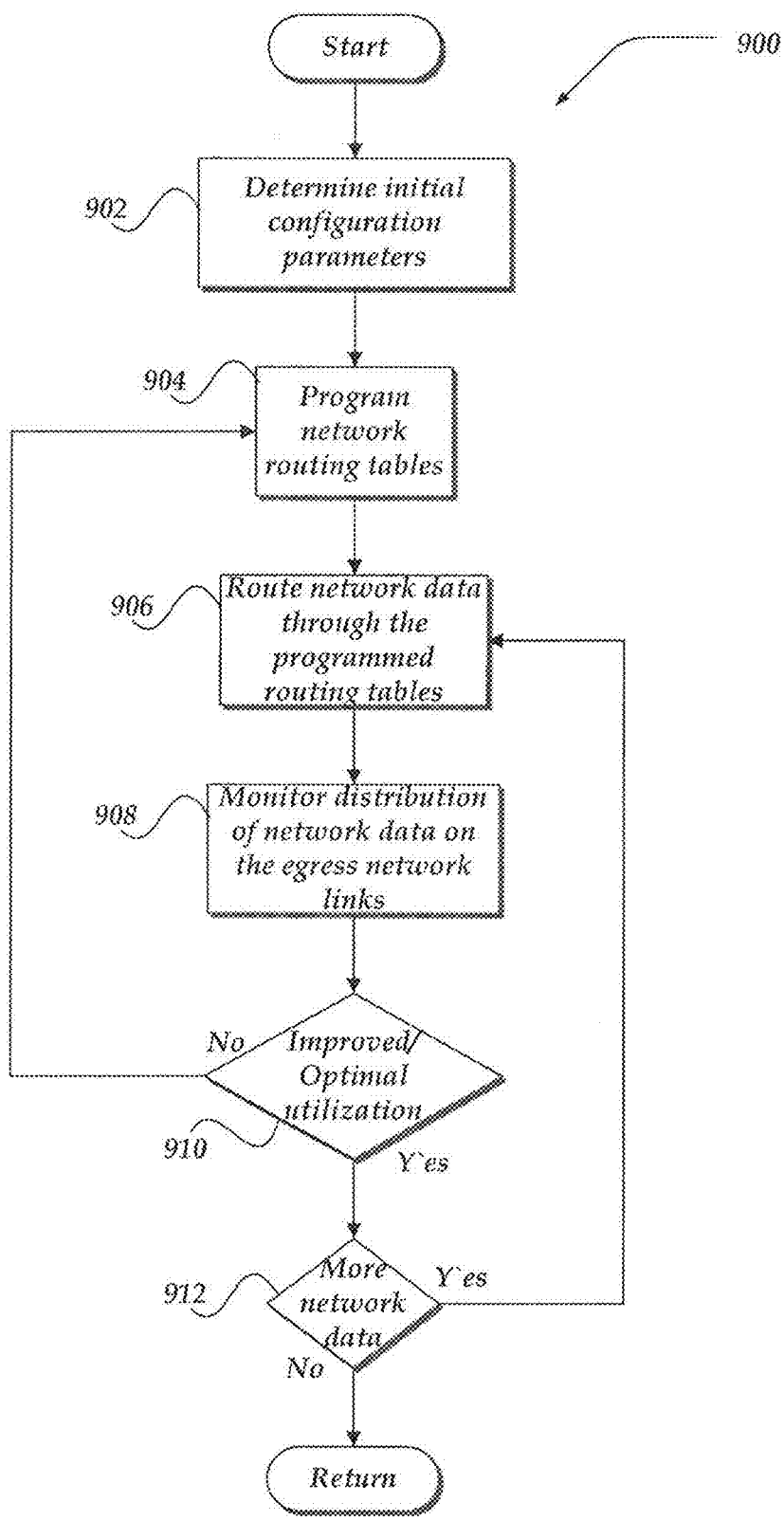
FIG. 9 shows a flow chart of a process for ECMP load balancing.

FIG. 9 is a flow chart for exemplary process 900, for at least one of the various embodiments, to determine how to adapt and program switching chip programmed network routing tables to improve the load balancing of incoming network data across equal cost next hop egress network links. Improvement may mean that the performance of an embodiment is approaching or equals one or more desired performance targets, such as, evenly distributing incoming network data across the equal cost next hop egress network links, distributing incoming network data to equal cost next hop egress network links with a desired proportional distribution of load (e.g, in some cases it may be desirable for one egress network link to carry more network data than the others.), and the like.

After a start block, the process continues to block 902 and determines the initial configuration parameters. Parameters may include the number of switching chips, the number of equal cost next hop egress network links, the available routing functions, all parameters that may be required by a routing a function, range or bit-size of hash keys (H), number of ingress network links, and the like. Some or all of the configuration parameters may be supplied by a configuration file, configured by an operator using a user interface or command-line interface, determined dynamically by a program that interrogates the respective elements of the embodiment, and the like.

Next, the process continues to block 904 and programs the network routing tables that are used to route incoming network data to equal cost next hop egress network links. The network routing tables can be programmed in different ways, such as by an automated process or an operator. In at least one of the various embodiments, a plurality of switching chips may have separate routing tables that are programmed to cooperatively route the network data to equal cost next hop egress network links. For example, even though the switching chips and their associated network routing tables may be separate and distinct, they can be programmed so the network routing tables and the switching chips are optimized as a unit.

Next, the process may continue to block 906 and routes incoming network data by using the programmed network routing tables. At block 908, as the incoming network data is routed through the programmed network routing tables, in at least one of the various embodiments, the process may monitor the load balancing of network data across the equal cost next hop egress network links. Monitoring may be enabled by observing and analyzing network data that is routed through each equal cost next hop egress network link. Also, another of the various embodiments may monitor the distribution of network data by tracking the amount of network data received at the endpoints of the equal cost next hop egress network links. Also, in at least one of the various embodiments, performance monitoring may be further enabled by using packet drop counters and/or queue drop counters that may be exposed by switching systems. Monitoring of network data distribution can be enabled by logging network protocol and/or packet headers and analyzing the collected data at future time. Another of the various embodiments may monitor the distribution of network data across the equal cost next hop egress network links by employing real-time probes, such as, protocol analyzers, traffic flow analyzers, SNMP, and the like. In at least one of the various embodiments, distribution monitoring may trigger a process that notifies an operator or a supervisory process when the distribution monitoring detects suboptimal or anomalous behavior. Notifications may be enabled by using one or more of well known methods such as email, text messaging, instant messaging, SNMP alarms, event logging, system logging, user-interface alerts, and the like.

At decision block 910, in at least one of the various embodiments, the exemplary process determines if the current programmed network routing tables are satisfactorily load balancing network data across the equal cost next hop egress network links. In at least one of the various embodiments, the process measures the performance of the load balancing by comparing the utilization of each of equal cost next hop egress network links to at least one determined threshold value. Threshold values may be determined from a configuration file, memory storage, and the like. In another of the various embodiments, an operator may determine a performance threshold by direct observation.

In another of the various embodiments, the process operates in a testing or learning mode where the performance of the current programmed network routing tables is analyzed to determine how they perform relative to other instances of programmed network routing tables. A learning mode may enable embodiments to learn or discover the best settings and configuration when an optimal solution may not be apparent. In at least one of the various embodiments, the testing may be performed automatically by a program that is monitoring load balancing similar to the actions discussed in regard to block 908. Alternatively, another of the various embodiments may enable the operator to make the decision whether the current programmed network table is performing better or worse than previously programmed network routing tables.

If at decision block 910 it is determined that the programmed network routing table is not performing as desired, the process may return to process block 904 and reprogram the network routing tables. But, if the programmed network routing tables are performing satisfactorily the process may continue to block 912. If an embodiment determines that there is more network data available for routing, the process jumps back to block 906 and continues routing network data. If there is no more network data available for routing, the process returns to the calling process.

Figure 10:
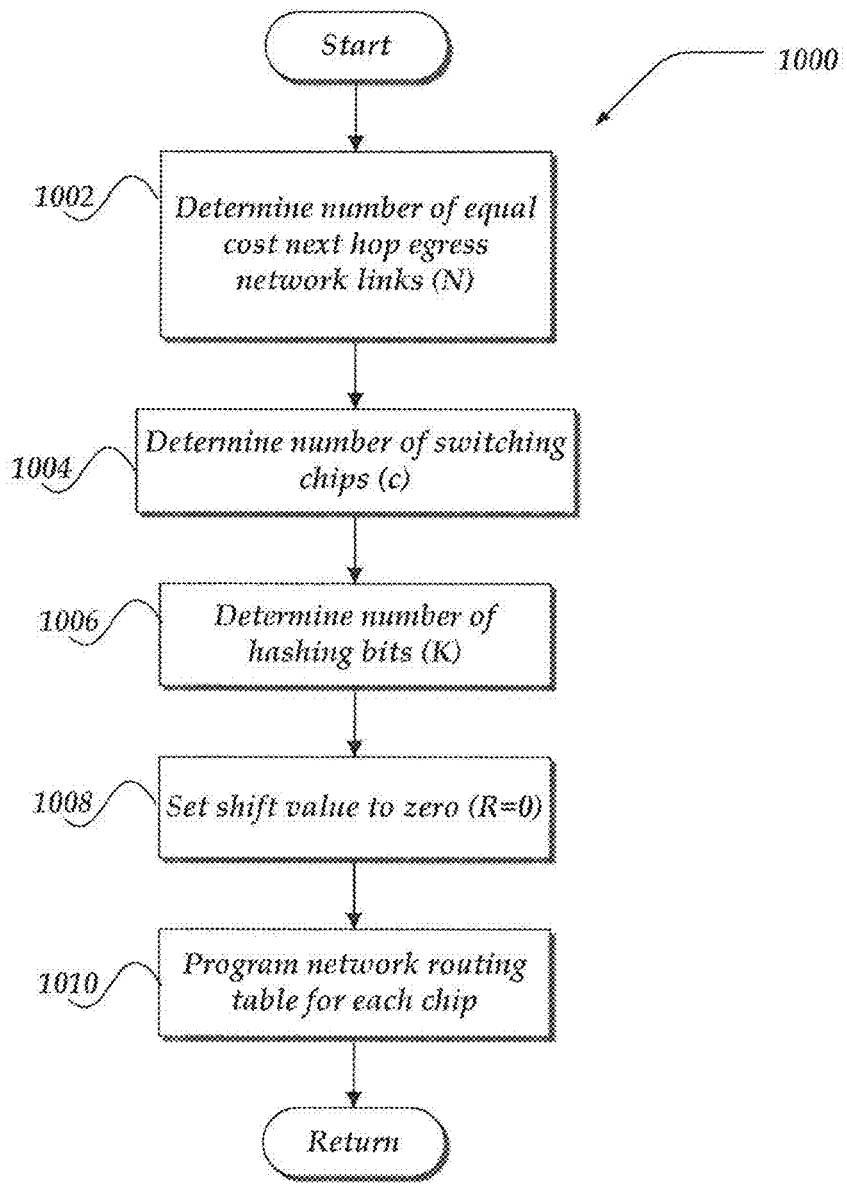
FIG. 10 shows a flow chart of a process for programming network routing tables.

FIG. 10 shows a flow chart for exemplary process 1000 programming network routing tables. In at least one of the various embodiments, after entering a start block, the process at block 1002 determines the number of equal cost next hop egress network links (N). Continuing to block 1004, the process determines the number of switching chips (c). Next, continuing to block 1006, the process determines the number hashing bits available (K=the bit-size of the hash values). Next, continuing to block 1008, the right shift value (R) is set to zero (0). After the above described initialization actions, the process continues to block 1010 and programs the network routing table for each switching chip. Next, the process returns to the calling process.

Figure 11:
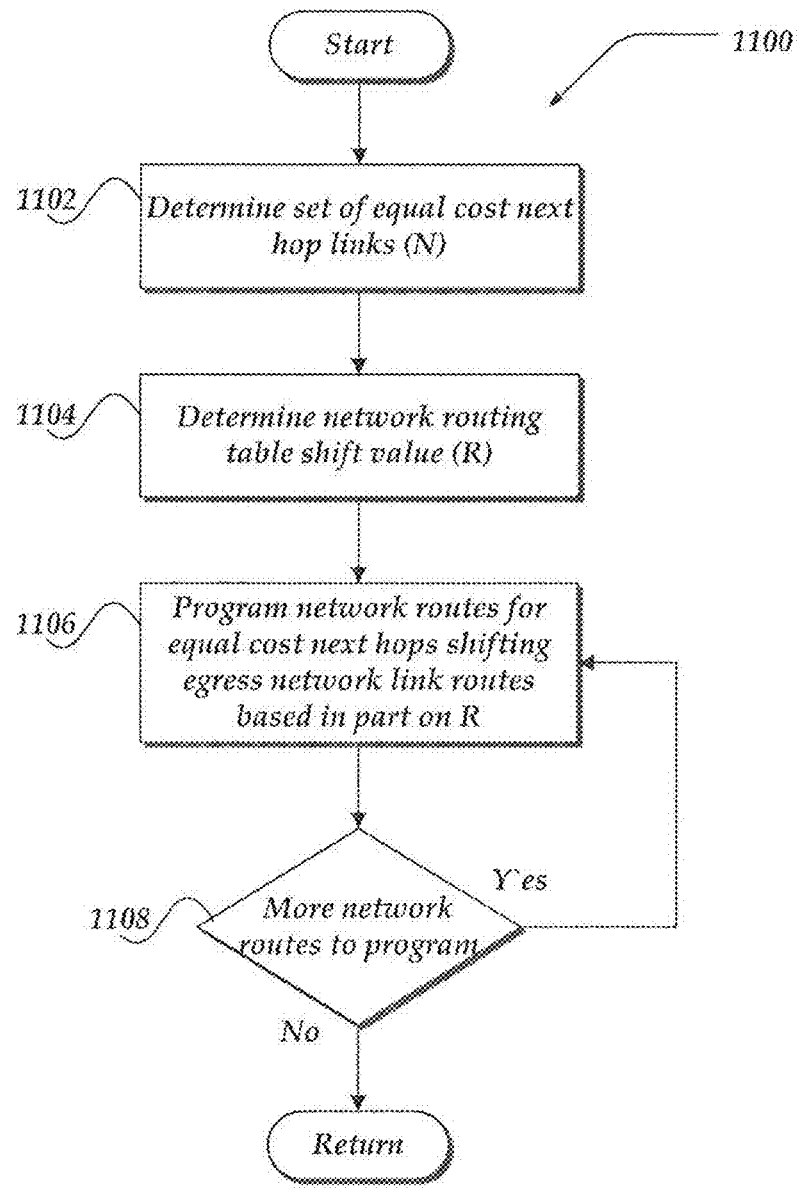
FIG. 11 shows a flow chart of a process for programming network routing tables using a right-shift R value.

FIG. 11 shows a flow chart for exemplary process 1100 for programming networking routing tables for a switching chip. After a start block, the process continues to block 1102 where the set of equal cost next hop egress network links (N) are determined. Continuing on to block 1104, the process determines a network routing table right-shift value (R). Embodiments may determine R a variety of ways, including but not limited to, retrieving from a configuration file, retrieving from a memory store, receiving the value from a calling process, receiving the value from an operator entering the value into a user-interface, calculating the value based on rules or program code that may be part of the load balancing function, and the like.

Continuing to block 1106, the process programs network routes for equal cost next hop egress network links by shifting the routes based at least in part on the right-shift value R. In at least one of the various embodiments, programming a network route may result in the assignment of a switching chip bin to a particular equal cost next hop egress network link. At least one of the various embodiments may program a switching chip network routing table as depicted in FIG. 5B or FIG. 5C. FIG. 5B shows one non-limiting example of a programmed network routing table where for switching chip C1, Bin B0 is assigned to egress network link L0, Bin B1 is assigned to egress network link L1, and so on. FIG. 5B shows, for at least one of the various embodiments, that the network routing table for switching chip C2 is programmed with a right-shift value of 1 (R=1). Thus, as shown in this non-limiting example, C2's Bin B0 is assigned to egress network link L1, Bin B1 is assigned to egress network link L2, Bin B2 is assigned to egress network link L3, Bin 3 is assigned to egress network link L4, and Bin B4 is assigned to egress network link L0. And, switching chip C3's network routing table is programmed using a right-shift value of 1, where the shift is based on switching chip C2's network routing table.

In at least one of the various embodiments, there may be multiple switching chips, each with a separate programmable network routing table. In some multi-chip embodiments subsequent switching chip network routing tables may be programmed based on right-shifting the assignment values relative to the previous programmed switching chip. See, FIGS. 5A-5C. Continuing on to decision block 1108, if the process determines that more network routes require programming, the process may jump back to block 1106. Otherwise, if there are no more network routes to program the process may return to the calling process.

Figure 12:
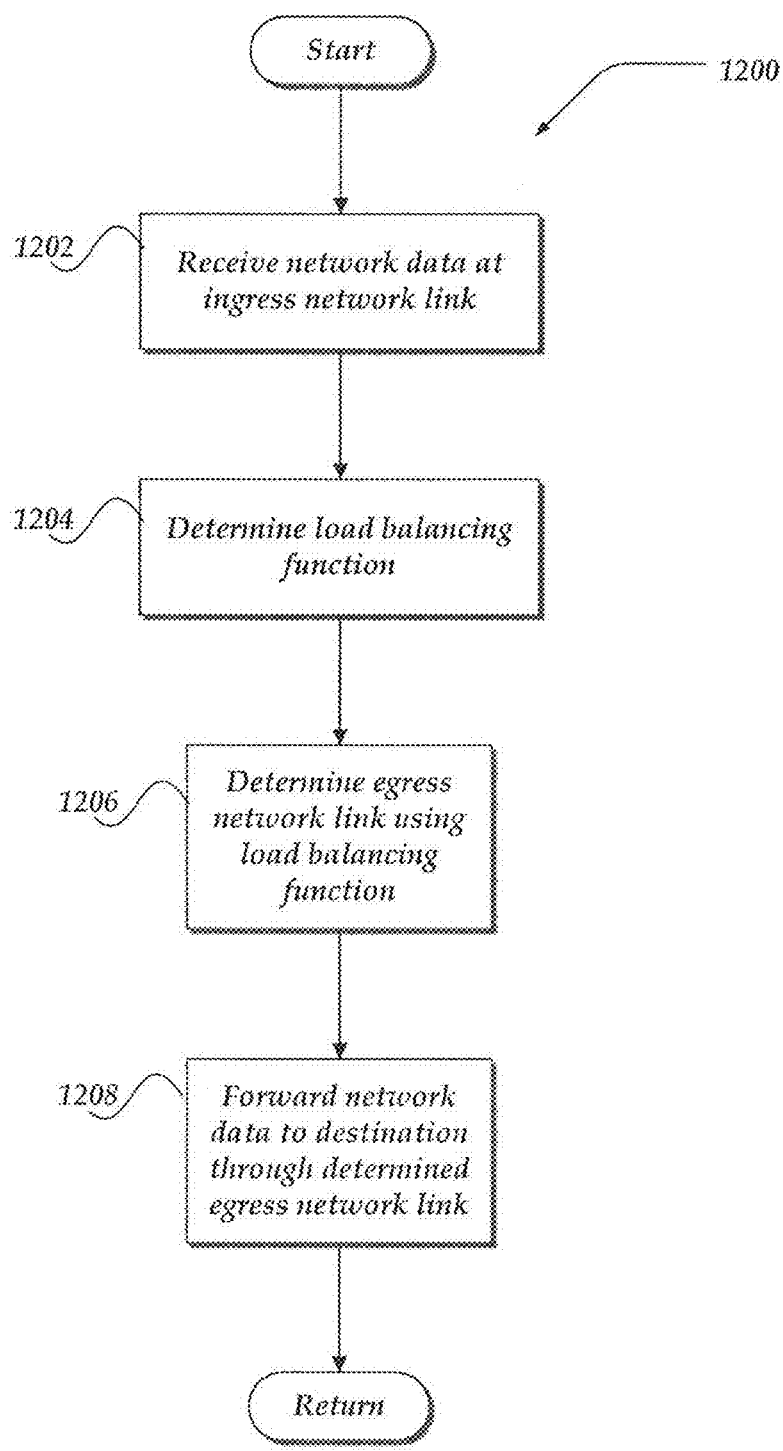
FIG. 12 shows a flow chart of a process for load balancing that determines which load balancing function to use.

In at least one of the various embodiments, shown in FIG. 12, exemplary process 1200, at block 1202, receives network data at one or more ingress network links. Various embodiments may be arranged or operable to accept network data that may be in a variety of protocols and formats, such as, Ethernet, IP, TCP/IP, UDP, IPX/SPX, SSL, X.25, Frame relay, ATM, MPLS, HTTP, and the like.

Continuing to block 1204, in at least one of the various embodiments, the process determines a load balancing function to use to load balance the incoming network data. The process examines the contents of the network data and determines a load balancing function based on the contents of the network data. The header fields and meta-data that are associated with the incoming network data may be examined as well. Another of the various embodiments may examine the equal cost next hop egress network links that are available and apply information about the egress network links to aid in determining a load balancing function. Factors that may be considered when determining a load balancing function can include, configuration data stored in memory or in a file, the source of the network data, the destination of the network data, the media or content type of the network data, current load/usage patterns on the available egress network links, available routing/switching hardware, available routing/switching software, and the like.

Continuing to block 1206, the process determines the equal cost next hop egress network link for the incoming network data based on the determined load balancing function. At block 1208, the process may route the network data to the determined destination through the determined equal cost next hop egress network link. Next, the process returns to the calling process.

Figure 13:
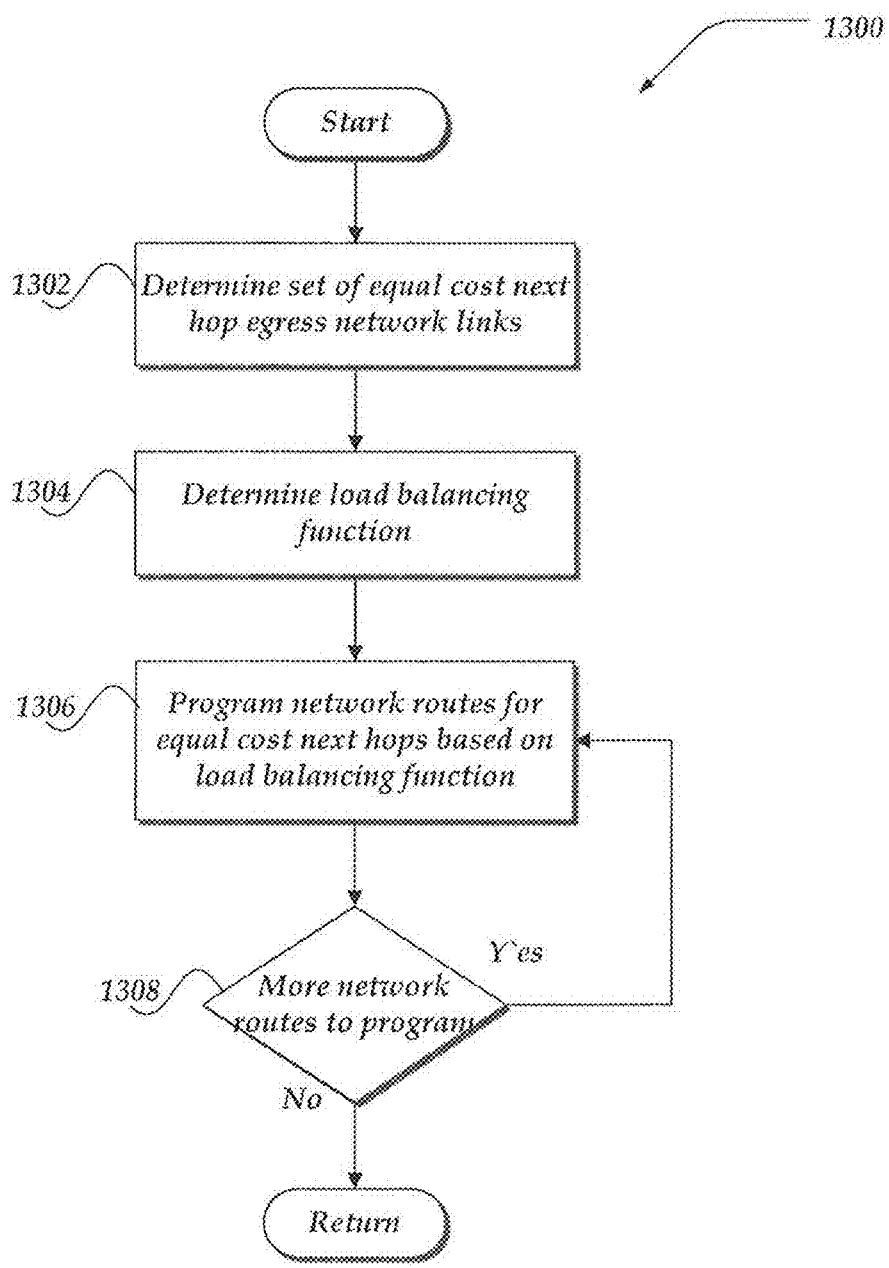
FIG. 13 shows a flow chart of a process for programming network routing tables that determines how to program the network routing tables based on the load balancing function.

In at least one of the various embodiments, as shown in FIG. 13, exemplary process 1300 programs network routes using a determined load balancing function. After a start block, the process advances to block 1302 to determine the set of equal cost next hop egress network links.

Continuing on to block 1304, the process determines a load balancing function for use in determining how to program the network routes. Factors that may be applied when determining a load balancing function can include, configuration data stored in memory or in file, the anticipated source of the network data, the anticipated destination of the network data, the expected media or content type of the network data, load/usage patterns on the available egress network links, available routing/switching hardware, available routing/switching software, operator preferences, and the like.

Continuing to block 1306, the process programs network routes for equal cost next hop egress network links based in part on the load balancing function. In at least one of the various embodiments, factors unrelated to the load balancing function may be considered when programming the network routes such as, configuration data stored in memory or in file, the anticipated source of the network data, the anticipated destination of the network data, the expected media type or content type expected network traffic, load/usage patterns on the available egress network links, available routing/switching hardware, available routing/switching software, and the like. In at least one of the various embodiments, the programming of the network routes may be automated by using other programs. In another of the various embodiments an operator may program the network routes using a user-interface, such as, a web-based graphical interface, a command line interface, and the like.

Continuing to decision block 1308, the process can jump back to block 1306 if there are more network routes to program. However, if there are no more network routes to program, the process returns to the calling process.

What is claimed as new and desired to be protected by Letters Patent of the United States is:

1. A method for load balancing data flow for a network device, comprising:
   programming, for each of a plurality of switching chips within a network device, a routing table with respective routing table entries to load balance forwarded data, wherein a first set of routine table entries corresponding to a first switching chip in the plurality of switching chips differs from a second set of routing table entries corresponding to a second switching chip in the plurality of switching chips;
   receiving data from an ingress network link at the network device;
   employing the network device to determine an identifier value based in part on the received data;
   determining, by one of the plurality of switching chips using the corresponding respective routing table, one of a plurality of egress network links available to the network device with at least a calculation based on the identifier value and an amount of the plurality of egress network links, wherein the amount is not a power of 2; and
   forwarding the received data to a next hop over the determined one of the plurality of egress network links.

2. The method of claim 1, further comprising if a distribution of data forwarded over the plurality of egress network link is relatively non-equivalent, re-programming the respective routing table entries for at least one switching chip within the network device to load balance the forwarded data in a relatively equivalent distribution over the plurality of egress network links.

3. The method of claim 1, wherein determining the identifier value further comprises performing a hash calculation on the received data to determine a hash value.

4. The method of claim 1, wherein the calculation based on the identifier value and the amount of the plurality of egress network links is a modulo calculation.

5. The method of claim 1, further comprising monitoring a distribution of the forwarded data over the plurality of egress network links.

6. The method of claim 1, further comprising employing at least one of a plurality of functions to load balance the data over the plurality of egress network links.

7. The method of claim 1, wherein the forwarding of the data is performed based at least in part on an equal cost multi-path (ECMP) routing function to load balance the data over the plurality of egress network links.

8. An apparatus for load balancing data flow over a network, comprising:
   a network device with a plurality of switching chips;
   one or more routing tables storing, for each switching chip in the plurality of switching chips, a respective set of routine table entries, wherein a first set of routine table entries corresponding to a first switching chip in the plurality of switching chips differs from a second set of routing table entries corresponding to a second switching chip in the plurality of switching chips;
   a memory for storing instructions;
   a processor for executing instructions that perform actions, including:
      receiving data from an ingress network link at the network device;
      employing the network device to determine an identifier value based in part on the received data;
      determining, by one of the plurality of switching chips using the corresponding respective routine table, one of a plurality of egress network links available to the network device with at least a calculation based on the identifier value and an amount of the plurality of egress network links, wherein the amount is not a power of 2; and
      forwarding the received data to a next hop over the determined one of the plurality of egress network links.

9. The apparatus of claim 8, further comprising if a distribution of data forwarded over the plurality of egress network link is relatively non-equivalent, programming the respective routing table entries for at least one switching chip within the network device to load balance the forwarded data in a relatively equivalent distribution over the plurality of egress network links.

10. The apparatus of claim 8, wherein determining the identifier value further comprises performing a hash calculation on the received data to determine a hash value.

11. The apparatus of claim 8, wherein the calculation based on the identifier value and the amount of the plurality of egress network links is a modulo calculation.

12. The apparatus of claim 8, further comprising monitoring a distribution of the forwarded data over the plurality of egress network links.

13. The apparatus of claim 8, further comprising employing at least one of a plurality of functions to load balance the data over the plurality of egress network links.

14. The apparatus of claim 8, wherein the forwarding of the data is performed based at least in part on an equal cost multi-path (ECMP) routing function to load balance the data over the plurality of egress network links.

15. A non-transitory processor readable storage media that includes instructions, wherein execution of the instructions by a processor enables actions for load balancing of data flow for a network device, comprising the actions of:
   programming, for each of a plurality of switching chips within a network device, a routing table with respective routing table entries to load balance forwarded data, wherein a first set of routing table entries corresponding to a first switching chip in the plurality of switching chips differs from a second set of routine table entries corresponding to a second switching chip in the plurality of switching chips;
   receiving data from an ingress network link at the network device;
   employing the network device to determine an identifier value based in part on the received data;
   determining, by one of the plurality of switching chips using the corresponding respective routing table, one of a plurality of egress network links available to the network device with at least a calculation based on the identifier value and an amount of the plurality of egress network links, wherein the amount is not a power of 2; and forwarding the received data to a next hop over the determined one of the plurality of egress network links.

16. The media of claim 15, further comprising if a distribution a distribution of data forwarded over the plurality of egress networks link is relatively non-equivalent, re-programming the respective routing table entries for at least one switching chip within the network device to load balance the forwarded data in a relatively equivalent distribution over the plurality of egress network limits.

17. The media of claim 15, wherein determining the identifier value further comprises performing a hash calculation on the received data to determine a hash value.

18. The media of claim 15, wherein the calculation based on the identifier value and the amount of the plurality of egress network links is a modulo calculation.

19. The method of claim 15, further comprising monitoring a distribution of the forwarded data over the plurality of egress network links.

20. The media of claim 15, further comprising employing at least one of a plurality of functions to load balance the data over the plurality of egress network links.

21. The media of claim 15, wherein the forwarding of the data is performed based at least in part on an equal cost multi-path (ECMP) routing function to load balance the data over the plurality of egress network links.

\* \* \* \* \*